(12) United States Patent
Chen et al.

(10) Patent No.: US 10,953,877 B2
(45) Date of Patent: Mar. 23, 2021

(54) ROAD CONDITION PREDICTION

(71) Applicant: INTERNATIONAL BUSINESS MACHINES CORPORATION, Armonk, NY (US)

(72) Inventors: Hao Chen, Beijing (CN); Ya Bin Dang, Beijing (CN); Qi Cheng Li, Beijing (CN); Shao Chun Li, Beijing (CN); Jie Ma, Nanjing (CN); Li Jun Mei, Beijing (CN); Jian Wang, Beijing (CN); Yi Peng Yu, Beijing (CN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 15/789,560

(22) Filed: Oct. 20, 2017

(65) Prior Publication Data

US 2019/0118813 A1    Apr. 25, 2019

(51) Int. Cl.
*B60W 50/14* (2020.01)
*B60W 30/18* (2012.01)

(52) U.S. Cl.
CPC ....... *B60W 30/18* (2013.01); *B60W 2050/146* (2013.01); *B60W 2400/00* (2013.01); *B60W 2420/42* (2013.01); *B60W 2552/00* (2020.02); *B60W 2552/35* (2020.02); *B60W 2554/00* (2020.02)

(58) Field of Classification Search
CPC .. G08G 1/0112; G08G 1/0133; G08G 1/0141; G08G 1/096716; G08G 1/096741; G08G 1/096775; G08G 1/0116; G08G 1/0129; G08G 1/096791; G08G 1/164; B60W 2400/00; B60W 2420/42; B60W 2550/10; B60W 2550/14; B60W 30/18; B60W 2550/147; E01C 23/01
See application file for complete search history.

(56) References Cited

U.S. PATENT DOCUMENTS

| | | | |
|---|---|---|---|
| 2005/0065711 A1* | 3/2005 | Dahlgren | G07C 5/008 701/117 |
| 2013/0030680 A1* | 1/2013 | Friedlander | B60W 40/06 701/117 |

(Continued)

OTHER PUBLICATIONS

Anonymous, "Automatic Potholes Detection Based on Individual Driving Behavior Patterns with Continuous Reverification and Ranking," An IP.com Prior Art Database Technical Disclosure, Oct. 1, 2013, pp. 1-6, IP.com No. IPCOM000231473D.

(Continued)

*Primary Examiner* — Ryan Rink
(74) *Attorney, Agent, or Firm* — Robert C. Bunker

(57) ABSTRACT

This disclosure provides a method for road condition prediction. The method comprises receiving, for at least one source vehicle, sensor data collected by a sensor associated with the source vehicle. The method further comprises identifying, based on the sensor data, at least a location with an abnormal road condition and a responsive action taken by the source vehicle. The method further comprises notifying, the location with the abnormal road condition and the responsive action to at least one target vehicle that is expected to pass the location. This disclosure also provides a computer system and a computer software product for road condition prediction.

17 Claims, 4 Drawing Sheets

(56) References Cited

U.S. PATENT DOCUMENTS

| | | | |
|---|---|---|---|
| 2013/0173208 A1 | 7/2013 | Kuzunishi et al. | |
| 2013/0322665 A1* | 12/2013 | Bennett | G08G 1/096855 |
| | | | 381/300 |
| 2014/0160295 A1 | 6/2014 | Kyomitsu et al. | |
| 2015/0254986 A1* | 9/2015 | Fairfield | G08G 1/22 |
| | | | 707/687 |
| 2016/0042644 A1 | 2/2016 | Velusamy | |
| 2016/0093212 A1* | 3/2016 | Barfield, Jr. | H04N 7/185 |
| | | | 348/144 |
| 2016/0275404 A1* | 9/2016 | Abraham | G08G 1/0967 |
| 2016/0375766 A1* | 12/2016 | Konet | G06K 9/00845 |
| | | | 348/148 |
| 2017/0069209 A1* | 3/2017 | Beaurepaire | G08G 1/096805 |
| 2017/0092121 A1* | 3/2017 | Augst | G08G 1/017 |
| 2017/0158191 A1* | 6/2017 | Bills | B60W 30/025 |
| 2017/0219369 A1* | 8/2017 | Lei | G01C 21/34 |
| 2017/0229012 A1* | 8/2017 | Bills | G08G 1/0967 |
| 2017/0248964 A1* | 8/2017 | Kentley | G01S 17/023 |
| 2018/0211529 A1* | 7/2018 | Kaur | G08G 1/0112 |
| 2019/0135283 A1* | 5/2019 | Bonk | B60W 30/18 |

OTHER PUBLICATIONS

Li et al., "Sensor-Based Authentication," Application and Drawings, Filed on Nov. 1, 2016, 24 Pages, U.S. Appl. No. 15/340,373.
Mell et al., "The NIST Definition of Cloud Computing," National Institute of Standards and Technology, Sep. 2011, pp. 1-3, Special Publication 800-145.

* cited by examiner

ROAD CONDITION PREDICTION

BACKGROUND

The present disclosure relates to information technology, and more specifically, to a method, a system and a computer program product for predicting road conditions.

Abnormal road conditions, such as obstacles or pits on the road, are one of the factors negatively impacting driving safety. The problem in this regard is that a spot with an abnormal road condition is typically unknown to the driver until the vehicle is close to the spot. A driver may have no time to take any emergent action, and have to continue with the original driving speed and direction. As a result, the abnormal road condition may cause damage to the vehicle. What is more dangerous is that the driver may suddenly change the driving direction, such as switching the lane, to try to evade the spot. This may cause traffic accident with the vehicles in the next lane.

SUMMARY

In this disclosure, it is proposed a method, a system and a computer program product for road condition prediction.

According to one embodiment of the present invention, there is provided a method for road condition prediction. According to the method, sensor data collected by a sensor associated with a source vehicle is received. The sensor data is analyzed to identifying at least a location with an abnormal road condition and a responsive action taken by the source vehicle. The information about the location with the abnormal road condition and the corresponding responsive action is then notified to at least one target vehicle that is expected to pass the location.

According to another embodiment of the present invention, there is provided a computer system for road condition prediction. The computer system includes a processor and a computer-readable memory coupled to the processor. The memory includes instructions executable by the processor. The processor, when executing the instructions, receives sensor data collected by a sensor associated with the source vehicle, identifies at least a location with an abnormal road condition and a responsive action taken by the source vehicle, and notifies the location with the abnormal road condition and the responsive action to at least one target vehicle that is expected to pass the location.

According to still another embodiment of the present invention, there is provided a computer program product. The computer program product includes a computer readable storage medium having program instructions embodied therewith, the program instructions executable by a processor to cause the processor to perform a method. According to the method, sensor data collected by a sensor associated with a source vehicle is received. The sensor data is analyzed to identifying at least a location with an abnormal road condition and a responsive action taken by the source vehicle. The information about the location with the abnormal road condition and the corresponding responsive action is then notified to at least one target vehicle that is expected to pass the location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
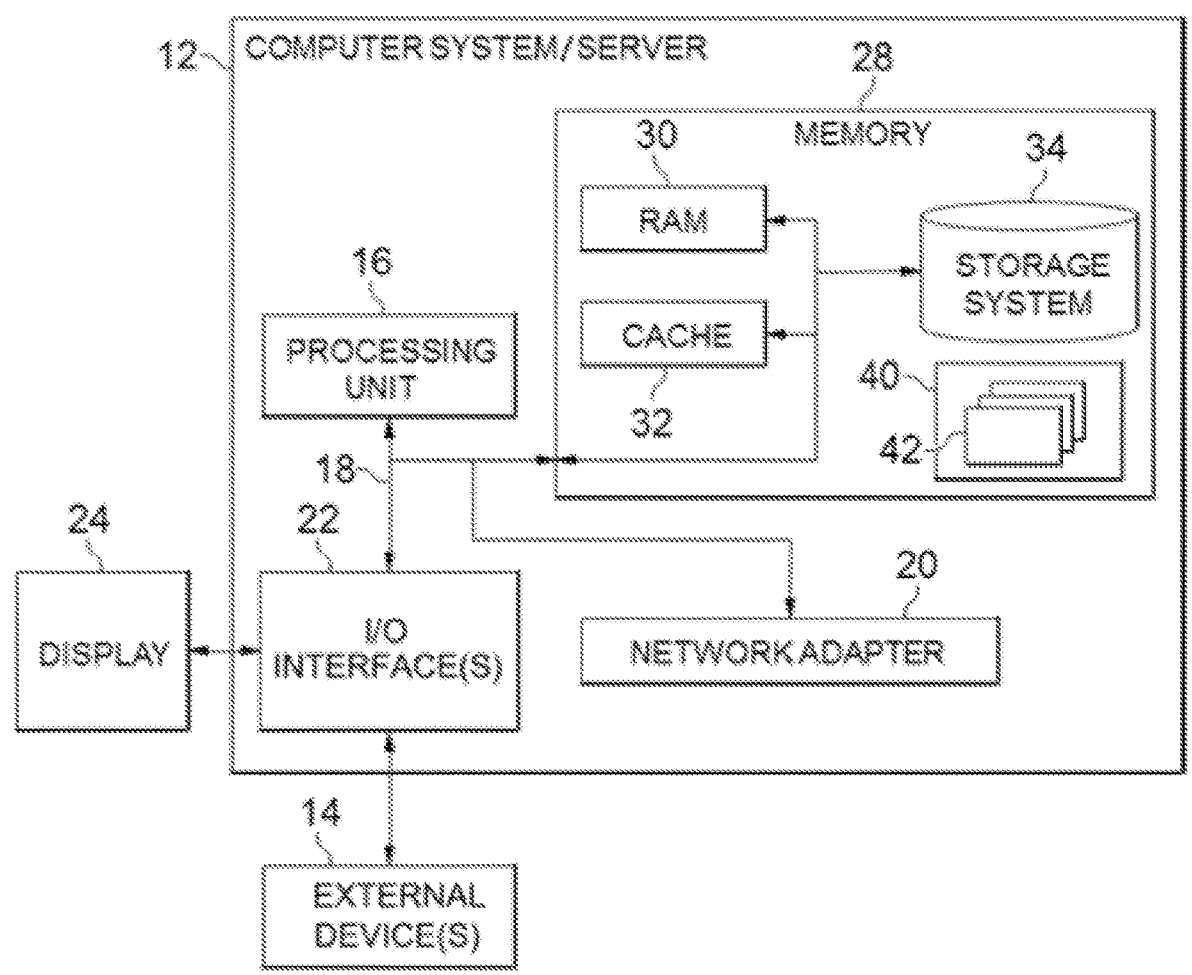
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As described previously, abnormal road conditions, such as obstacles or pits on the road, are one of the factors negatively impacting driving safety. The problem in this regard is that a spot with an abnormal road condition is typically unknown to the driver until the vehicle is close to the spot. A driver may have no time to take any emergent action, and have to continue with the original driving speed and direction. As a result, the abnormal road condition may cause damage to the vehicle. What is more dangerous is that the driver may suddenly change the driving direction, such as switching the lane, to try to evade the spot. This may cause traffic accident with the vehicles in the next lane. It is therefore desirable for a solution to detect the abnormal road condition beforehand, and notify the driver about the abnormal road condition before the vehicle is too close to the spot for the driver to make any gentle response.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which can also be adapted to depict an illustrative example of a portable electronic device such as a communication device being applicable to implement the embodiments of the present invention, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
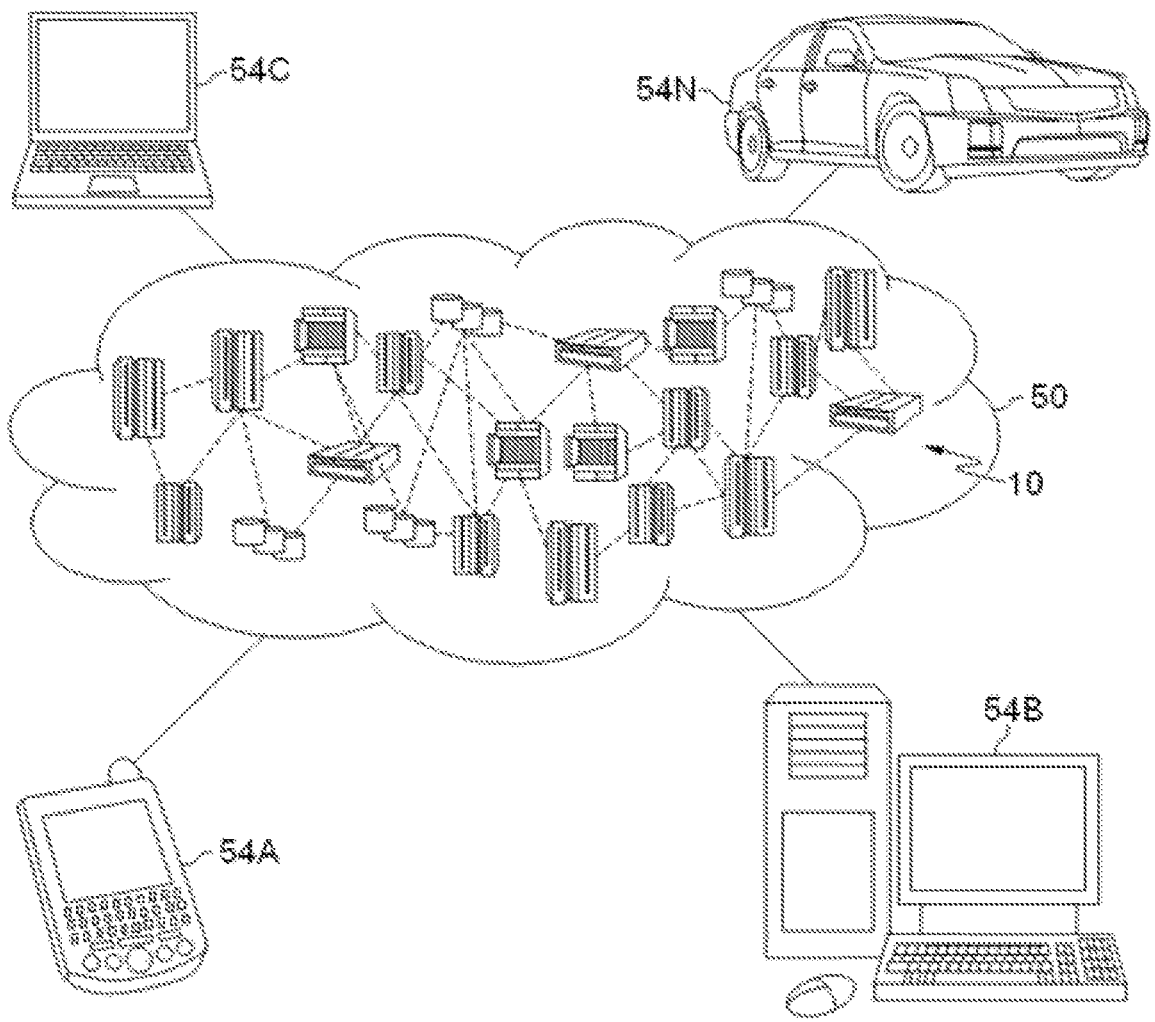
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
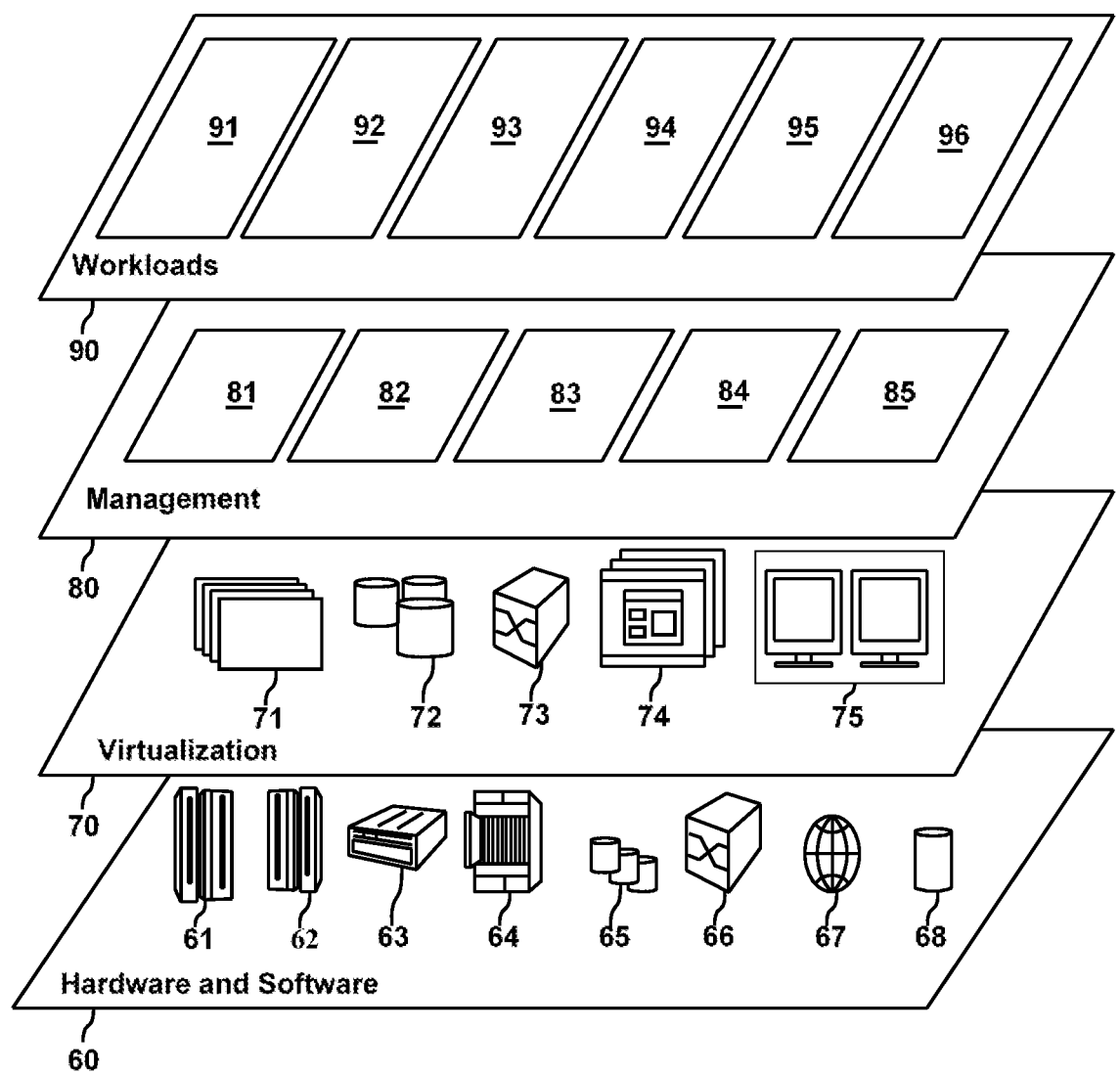
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and road condition prediction 96.

Figure 4:
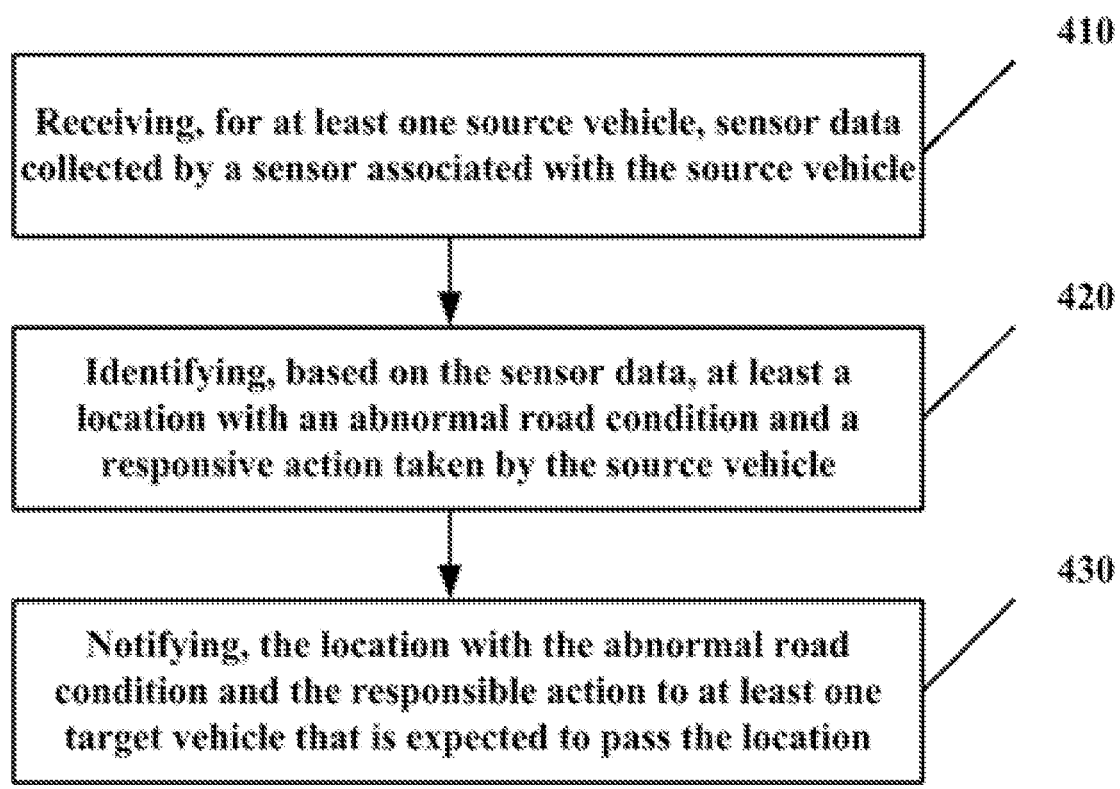
FIG. 4 is a flowchart illustrating a method for road condition prediction according to an embodiment of the present invention.

With reference now to FIG. 4, FIG. 4 shows a flowchart illustrating a method for road condition prediction according to an embodiment of the present invention. As shown in FIG. 4, the method for road condition prediction includes a data receiving step 410, an identification step 420, and a notifying step 430. In one embodiment of the invention, the method in FIG. 4 is performed in the computer system/server 12 in FIG. 1. In one embodiment of the invention, the computer-implemented method in FIG. 4 is performed in a computer system/server 12 in the cloud computing node 10. In one embodiment of the invention, the computer-implemented method in FIG. 4 is performed in real time.

Specifically, in the data receiving step 410, data collected by sensors associated with the vehicle may be received. Nowadays, a vehicle may be equipped with sensors and communication modules. Embodiments of the invention may use a gyroscope sensor, a positioning sensor such as a GPS receiver, and a light sensor such as a camera, but the vehicle may have other sensors installed. The vehicle may also have a signal transceiver that is compatible to popular communication protocols such as 3G, 4G, Wi-Fi, and etc. In case the vehicle does not have such sensors or communication modules, a mobile phone may be registered to be associated with the vehicle so that the gyroscope sensor, GPS receiver, camera, and communication module of the mobile phone can be used to implement embodiments of the present invention. In the below description, "by the vehicle" means "by the vehicle itself" or "by a device associated with the vehicle." Similarly, "to the vehicle" means "to the vehicle itself" or "to the device associated with the vehicle." In the below description, the vehicle passing the location with abnormal road condition is referred to as source vehicle, as the vehicle passing the location with abnormal road condition is the source of the information about the abnormal road condition.

According to one embodiment of the invention, sensor data may be transmitted to the computer system/server 12 periodically by the source vehicle. According to another embodiment, the sensor data may be transmitted only when there is an event potentially indicating an abnormal road condition. For example, if the sensor detects a sudden change in the moving status of the source vehicle, such as a change in the direction, a change in the speed, an up-and-down of the source vehicle, then it may be determined that there is an event potentially indicating an abnormal road condition. The change in the moving status may be detected by a gyroscope sensor. In response to that event, the sensor data, including those collected by the gyroscope sensor, plus those collected by other sensors according to various embodiments of the present invention, may be transmitted to the computer system/server 12 via a communication network (e.g., Wi-Fi).

In the identification step 420, the sensor data may then be analyzed to identify the location with the abnormal road condition, and the responsive action taken by the source vehicle.

According to one embodiment of the invention, the sensor data may be a snapshot collected by a light sensor such as a camera. For example, the snapshot may be a video. Existing video processing technologies may be used to abstract information about objects in the snapshot, as well as the changes with regard to the objects. The abstracted information may be used to identify the location where the snapshot is generated, as well as the changes in the moving status of the source vehicle when the snapshot is generated. For example, there may be landmark buildings in the snapshot, and the relative positions of the landmark buildings may be analyzed to get the location. Changes with regard to the objects in the snapshot may be easily mapped to the changes of the moving status of the source vehicle. The changes in the moving status of the source vehicle may be deemed as the responsive action taken by the source vehicle.

According to another embodiment of the invention, the sensor data may include data collected by the gyroscope sensor and data collected by a positioning sensor such as a GPS receiver. The GPS data may be used to determine the position of the location with abnormal road condition, and the gyroscope data may be used to determine the change in the moving status of the source vehicle, which may be deemed as the responsive action taken by the source vehicle.

According to embodiments of the invention, sensor data collected by different types of sensor can be consolidated for the purpose of identifying the location with the abnormal road condition, and the corresponding responsive action. For example, the data collected by the light sensor may be used to identify the location, while the data collected by the gyroscope sensor may be used to identify the responsive action. According to another example, the data collected by the light sensor and the data collected by the gyroscope sensor may be used to identify the responsive action respectively, then the responsive action identified based on the light sensor data and the responsive action identified based on the gyroscope data may be cross-checked for verification.

In the notifying step 430, the location with abnormal road condition and the responsive action taken by the source vehicle is notified to at least one other vehicle that is expected to pass the location. In the below description, the vehicle that is expected to pass the location with the abnormal road condition is referred to as target vehicle. The driver of the target vehicle, with the knowledge about the location with the abnormal road condition and the responsive action taken by the source vehicle having passed that location, has various options to handle this situation. One option is to change the route. If changing the route is not feasible, at least the driver may take the same action gently. For example, if slowing down is required, the driver can lower the speed beforehand so that there is no need for a sharp braking. According to another example, if switching the lane is required, the driver may do the switching far before the vehicle arrives at the location with the abnormal condition, so that the risk of causing a traffic accident with the vehicles in the lane nearby may be mitigated. The driver of the target vehicle may also take any other action they deem to be appropriate as they now have plenty of time to think about it.

According to one embodiment of the invention, information about the exact change in the moving status may be notified to the target vehicle. For example, the source vehicle is slowed down from 70 miles per hour to 20 miles per hour, or the source vehicle moved to the right by 1.5 meters in the direction orthogonal to the road. Accordingly, a visual illustration may be presented to the driver by the target vehicle. According to one embodiment of the invention, a limited list of actions is used for the purpose of notifying the target vehicle. For example, the list may include these categories: slowing down, switching to the lane to the right of the current lane, switching to the lane to the left of the current lane, driving at the right portion of the current lane, driving at the left portion of the current lane. The changes in the moving status of the source vehicle may be classified into the one of the categories. Only the selected category will be notified to the target vehicle as the responsive action of the source vehicle. This will simplify the information presented to the driver of the target vehicle, so as to reduce the need for the driver's attention.

Currently, the positional accuracy of commercialized GPS receiver is about ten meters. It is desirable to enhance the positional accuracy to better describe the location with abnormal road condition. Gyroscope data may be used to represent a movement within a distance threshold. According to one embodiment of the invention, the GPS data is used together with the gyroscope data to refine the positioning information about the location with abnormal road condition. For example, the GPS data is used to determine a rough position of the location with the abnormal road condition, and the gyroscope data is used to tuning the rough positioning information.

For example, if there is an event that is detectable by the gyroscope sensor and meanwhile can be mapped to a specific location of the road, then any location having a distance from the specific location less than the threshold can be positioned with the gyroscope data. For example, a turn, either left turn or right turn, is detectable by the gyroscope sensor, and the turn can be mapped to the entry of the road. Assume that the threshold is thirty meters, which means the gyroscope date can represent a movement within thirty meters. Therefore, if the gyroscope data shows that the source vehicle makes a turn, moves fifteen meters, and encounters the location with abnormal road condition, then it can be determined from the gyroscope data that the location with abnormal road condition is fifteen meters beyond the entrance of the road. This positioning information determined based on the gyroscope data may be cross-referenced with the positioning information determined based on the GPS data.

For a road with multiple lanes, it is desirable to identify the exact lane with the abnormal road condition. However, the width of a lane is about three meters. This means the GPS data alone may not be enough for the purpose of lane determination. According to another embodiment of the present invention, the gyroscope data is used to provide more information about which lane has the abnormal road condition. As mentioned above, gyroscope data may be used to represent a movement within a distance threshold. For the purpose of lane determination, the movement in the direction orthogonal to the road direction may be determined from the gyroscope data. The distance of such movement can tell whether there is a lane switching and if yes, the direction of the lane switching. If the movement corresponds to a lane switching to the left of the current lane, then it can be determined that the current lane is not the leftmost lane of the road. For a two-lane scenario, it can be further determined that the current lane is the right lane. Similarly, if the movement corresponds to a lane switching to the right of the current lane, then it can be determined that the current lane is not the rightmost lane of the road. For a two-lane scenario, it can be further determined that the current lane is the left lane.

For a road with three or more lanes, the additional information determined with the methodology described above is still useful to the driver of the target vehicle. For example, for a three-lane scenario, if it is determined that the current lane is not the leftmost lane of the road, then the driver can move his/her vehicle to the leftmost lane when he/she receives the information, so that he/she does not need to take further action when approaching the location with abnormal road condition.

According to one embodiment of the present invention, information about the type of the source vehicle having passed the location with abnormal road condition is further transmitted to the computer system/server 12. Such information is associated with information about the vibration effect that the source vehicle experiences when passing the location with the abnormal road condition. The information about the vibration effect may be determined from the sensor data received in the receiving step 410. For example, the vibration effect may be measured by a vibration sensor or a gyroscope sensor. The notifying step 430 may be performed based on the information about the type and the information about the vibration effect.

According to one embodiment of the invention, only those target vehicles that may suffer more serious vibration effect than the source vehicle will receive a notification about the abnormal road condition. Whether the target vehicle will suffer more serious vibration effect than the source vehicle may be determined by the type of that vehicle and the source vehicle. For example, a small car may suffer more serious vibration effect than a sport utility vehicle (SUV), and a truck may suffer less serious vibration effect than the SUV. According to one embodiment of the invention, if the source car is an SUV, then the small car may receive the notification but the truck may not receive it. According to another embodiment of the invention, an algorithm may be used to estimate what level of vibration effect the target vehicle is expected to suffer, based on the level of vibration effect the source level has suffered, and further based on the types of the source vehicle and the target vehicle. Accordingly, only when the estimated level of vibration effect for the target vehicle exceeds a threshold level, the target car will be notified about the abnormal road condition.

It may be understood that the sensor data received from the source vehicle may include noises. For example, in the scenario where the sensor data is collected by sensors in the mobile phone associated with the source vehicle, the change in the moving status may be caused by the mobile phone, but not the vehicle. The driver may simply pick up the mobile phone, and then put it back. The movement of the mobile phone may cause a false positive about the abnormal road condition.

According to one embodiment of the invention, sensor data is received from multiple source vehicles. The sensor data received from multiple source vehicles is then analyzed and cross-checked to reduce the impact of the noises. For example, the sensor data received from each of the multiple source vehicles may be analyzed according to the Steps 410 and 420 in FIG. 4, so that the information about the location with abnormal road condition as well as the responsive action may be identified for each of the multiple source vehicles. If there is a common problematic location, it may be determined that this common location has abnormal road condition, and in turn, Step 430 is performed to notify the target vehicles.

To determine whether there is a common problematic location, according to one embodiment of the invention, the number of vehicles report the same or similar problematic location (i.e., the location with abnormal road condition) may be counted. For sake of clarity, "report" here does not necessarily mean the vehicle needs to identify the location with abnormal road condition by itself. The vehicle may just send the sensor data for identification by the computer system/server 12, and this may also be a "report" by the vehicle. If the number of the vehicles reporting the same or similar problematic location exceeds a reporting threshold, it may be determined that there is a common problematic location. On the contrary, if the number of the vehicles reporting the same or similar problematic location is lower than the reporting threshold, for example only one, it is likely that the noises in the sensor data have caused a false positive.

According to one embodiment of the invention, if the source vehicles reporting the same or similar problematic location have different responsive actions, further evaluation may be conducted to determine which of the responsive actions should be notified to the target vehicle. According to one embodiment of the invention, the types of the source vehicle and the target vehicle are considered. For example, responsive action of the source vehicle with the same or similar type as the target vehicle may be notified to the target vehicle. According to another embodiment, the responsive action that may cause least impact on other vehicles may be used to notify to the target vehicle. For example, lowering down the speed may have less impact on other vehicles than lane switching, therefore the lowering speed action may be sent to notify the target vehicle.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, for a source vehicle, a plurality of sensor data collected by at least one sensor associated with the source vehicle and a source vehicle type of the source vehicle;
    identifying, based on the retrieved plurality of sensor data, at least a location with an abnormal road condition and a responsive action taken by the source vehicle, wherein the responsive action results in a change in a moving status of the source vehicle;
    determining, based on the received plurality of sensor data and the source vehicle type, a plurality of vibration information about a vibration effect caused by the abnormal road condition;
    calculating a target vehicle vibration effect of at least one target vehicle based on the determined plurality of vibration information and a target vehicle type of each of the at least one target vehicle;
    responsive to determining the calculated target vehicle vibration effect exceeds a vibration threshold value, notifying, the location with the abnormal road condition and a category of an avoidance action based on the responsive action to the at least one target vehicle that is expected to pass the location;
    generating a visual illustration of the change in the moving status by the source vehicle based on the location and the category of the avoidance action; and
    presenting the generated visual illustration to at least one target vehicle driver.

2. The computer-implemented method of claim 1, wherein the at least one sensor comprises at least one gyroscope sensor.

3. The computer-implemented method of claim 2, further comprising:
    determining, based on the data collected by the at least one gyroscope sensor, the change in the moving status of the at least one source vehicle; and
    selecting, according to the determined change, the responsive action from a list of actions.

4. The computer-implemented method of claim 2, wherein the at least one sensor further comprises at least one positioning sensor associated with the source vehicle, and wherein identifying the location comprises:
    determining, based on the data collected by at least one positioning sensor, a plurality of rough positioning information of the location with the abnormal road condition; and
    tuning the rough positioning information with the data collected by the at least one gyroscope sensor.

5. The computer-implemented method of claim 4, wherein tuning the rough positioning information further comprises:
    identifying, based on the data collected by the at least one gyroscope sensor, a movement of the source vehicle in a direction orthogonal to the road direction; and
    tuning the rough positioning information based on the movement.

6. The computer-implemented method of claim 1, wherein the received plurality of sensor data comprises a snapshot collected by at least one light sensor associated with the source vehicle, and wherein the identifying comprises:
    identifying, through processing the snapshot, the location with the abnormal road condition and the responsive action taken by the source vehicle.

7. A computer system, comprising:
    a processor;
    a computer-readable memory coupled to the processor, the memory comprising instructions that when executed by the processor perform actions of:
    receiving, for a source vehicle, a plurality of sensor data collected by at least one sensor associated with the source vehicle and a source vehicle type of the source vehicle;
    identifying, based on the retrieved plurality of sensor data, at least a location with an abnormal road condition and a responsive action taken by the source vehicle, wherein the responsive action results in a change in a moving status of the source vehicle;
    determining, based on the received plurality of sensor data and the source vehicle type, a plurality of vibration information about a vibration effect caused by the abnormal road condition;
    calculating a target vehicle vibration effect of at least one target vehicle based on the determined plurality of vibration information and a target vehicle type of each of the at least one target vehicle;
    responsive to determining the calculated target vehicle vibration effect exceeds a vibration threshold value, notifying, the location with the abnormal road condition and a category of an avoidance action based on the responsive action to the at least one target vehicle that is expected to pass the location;
    generating a visual illustration of the change in the moving status by the source vehicle based on the location and the category of the avoidance action; and
    presenting the generated visual illustration to at least one target vehicle driver.

8. The computer system of claim 7, wherein the at least one sensor comprises at least one gyroscope sensor.

9. The computer system of claim 8, further comprising:
    determining, based on the data collected by the at least one gyroscope sensor, the change in the moving status of the at least one source vehicle; and
    selecting, according to the determined change, the responsive action from a list of actions.

10. The computer system of claim 8, wherein the at least one sensor further comprises at least one positioning sensor associated with the source vehicle, and wherein identifying the location comprises:
    determining, based on the data collected by at least one positioning sensor, a plurality of rough positioning information of the location with the abnormal road condition; and
    tuning the rough positioning information with the data collected by the at least one gyroscope sensor.

11. The computer system of claim 10, wherein tuning the rough positioning information further comprises:
identifying, based on the data collected by the at least one gyroscope sensor, a movement of the source vehicle in a direction orthogonal to the road direction; and
tuning the rough positioning information based on the movement.

12. The computer system of claim 7, wherein the received plurality of sensor data comprises a snapshot collected by at least one light sensor associated with the source vehicle, and wherein the identifying comprises:
identifying, through processing the snapshot, the location with the abnormal road condition and the responsive action taken by the source vehicle.

13. A computer program product, comprising a non-transitory computer readable storage medium having program instructions embodied therewith, the program instructions executable by a processor to cause the processor to perform a method comprising:
receiving, for a source vehicle, a plurality of sensor data collected by at least one sensor associated with the source vehicle and a source vehicle type of the source vehicle;
identifying, based on the retrieved plurality of sensor data, at least a location with an abnormal road condition and a responsive action taken by the source vehicle, wherein the responsive action results in a change in a moving status of the source vehicle;
determining, based on the received plurality of sensor data and the source vehicle type, a plurality of vibration information about a vibration effect caused by the abnormal road condition;
calculating a target vehicle vibration effect of at least one target vehicle based on the determined plurality of vibration information and a target vehicle type of each of the at least one target vehicle;
responsive to determining the calculated target vehicle vibration effect exceeds a vibration threshold value, notifying, the location with the abnormal road condition and a category of an avoidance action based on the responsive action to the at least one target vehicle that is expected to pass the location;
generating a visual illustration of the change in the moving status by the source vehicle based on the location and the category of the avoidance action; and
presenting the generated visual illustration to at least one target vehicle driver.

14. The computer program product of claim 13, wherein the at least one sensor comprises at least one gyroscope sensor associated with the source vehicle.

15. The computer program product of claim 14, the program instructions executable by a processor to further cause the processor to:
determine, based on the data collected by the at least one gyroscope sensor, the change in the moving status of the at least one source vehicle; and
select, according to the determined change, the responsive action from a list of actions.

16. The computer program product of claim 14, wherein the at least one sensor further comprises at least one positioning sensor associated with the source vehicle, and wherein identifying the location comprises:
determining, based on the data collected by at least one positioning sensor, a plurality of rough positioning information of the location with the abnormal road condition; and
tuning the rough positioning information with the data collected by the at least one gyroscope sensor.

17. The computer program product of claim 16, wherein tuning the rough positioning information further comprises:
identifying, based on the data collected by the at least one gyroscope sensor, a movement of the source vehicle in a direction orthogonal to the road direction; and
tuning the rough positioning information based on the movement.

* * * * *